United States Patent
Maciocco et al.

(10) Patent No.: US 8,036,115 B2
(45) Date of Patent: Oct. 11, 2011

(54) SYNCHRONIZATION OF MULTIPLE INCOMING NETWORK COMMUNICATION STREAMS

(75) Inventors: Christian Maciocco, Portland, OR (US);
Sanjay Bakshi, Beaverton, OR (US);
Shriharsha Hegde, Beaverton, OR (US); Carol Bell, Beaverton, OR (US);
Tsung-Yuan Charles Tai, Portland, OR (US); Jr-Shian Tsai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 12/283,931

(22) Filed: Sep. 17, 2008

(65) Prior Publication Data
US 2010/0070652 A1 Mar. 18, 2010

(51) Int. Cl.
*G01R 31/08* (2006.01)
*H04L 12/28* (2006.01)

(52) U.S. Cl. ........................................ 370/230; 370/412

(58) Field of Classification Search .................. None
See application file for complete search history.

(56) References Cited

U.S. PATENT DOCUMENTS

| | | | |
|---|---|---|---|
| 7,525,912 B2 * | 4/2009 | Yazaki et al. | 370/230.1 |
| 2002/0141427 A1 * | 10/2002 | McAlpine | 370/413 |
| 2002/0150115 A1 * | 10/2002 | Onvural et al. | 370/411 |
| 2006/0013225 A1 * | 1/2006 | Haywood et al. | 370/389 |
| 2006/0062152 A1 * | 3/2006 | Shi et al. | 370/235 |
| 2008/0175270 A1 * | 7/2008 | Kataria et al. | 370/468 |

* cited by examiner

*Primary Examiner* — Hassan Phillips
*Assistant Examiner* — Eunsook Choi
(74) *Attorney, Agent, or Firm* — Derek J. Reynolds

(57) ABSTRACT

A device, method, and computer readable medium are disclosed. In one embodiment the device includes a first network packet storage queue that is capable of storing incoming network packets from a network. The device also includes a second network packet storage queue that is capable of storing incoming network packets from a network. The device also includes flush logic to synchronize a flush of the network packets stored in the first and second network packet storage queues. The flush is triggered by a flush event affecting at least one of the storage queues.

16 Claims, 3 Drawing Sheets

SYNCHRONIZATION OF MULTIPLE INCOMING NETWORK COMMUNICATION STREAMS

FIELD OF THE INVENTION

The invention relates to the synchronization of network streams.

BACKGROUND OF THE INVENTION

Most modern computer processors have several processor power states available including a fully operational state and one or more sleep states, which allows an idle processor to consume less power. Almost all mobile computer platforms, servers platforms, and desktop platforms offer network connectivity through one or more network communication interfaces. While the communication components utilized by a computer platform to connect to a network consume a relatively small portion of the overall platform power, the impact of network communications usages on total platform power consumption is significant. This is due to the non-deterministic nature of the incoming network traffic which keeps the platform active and in a higher power consuming state more than necessary.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
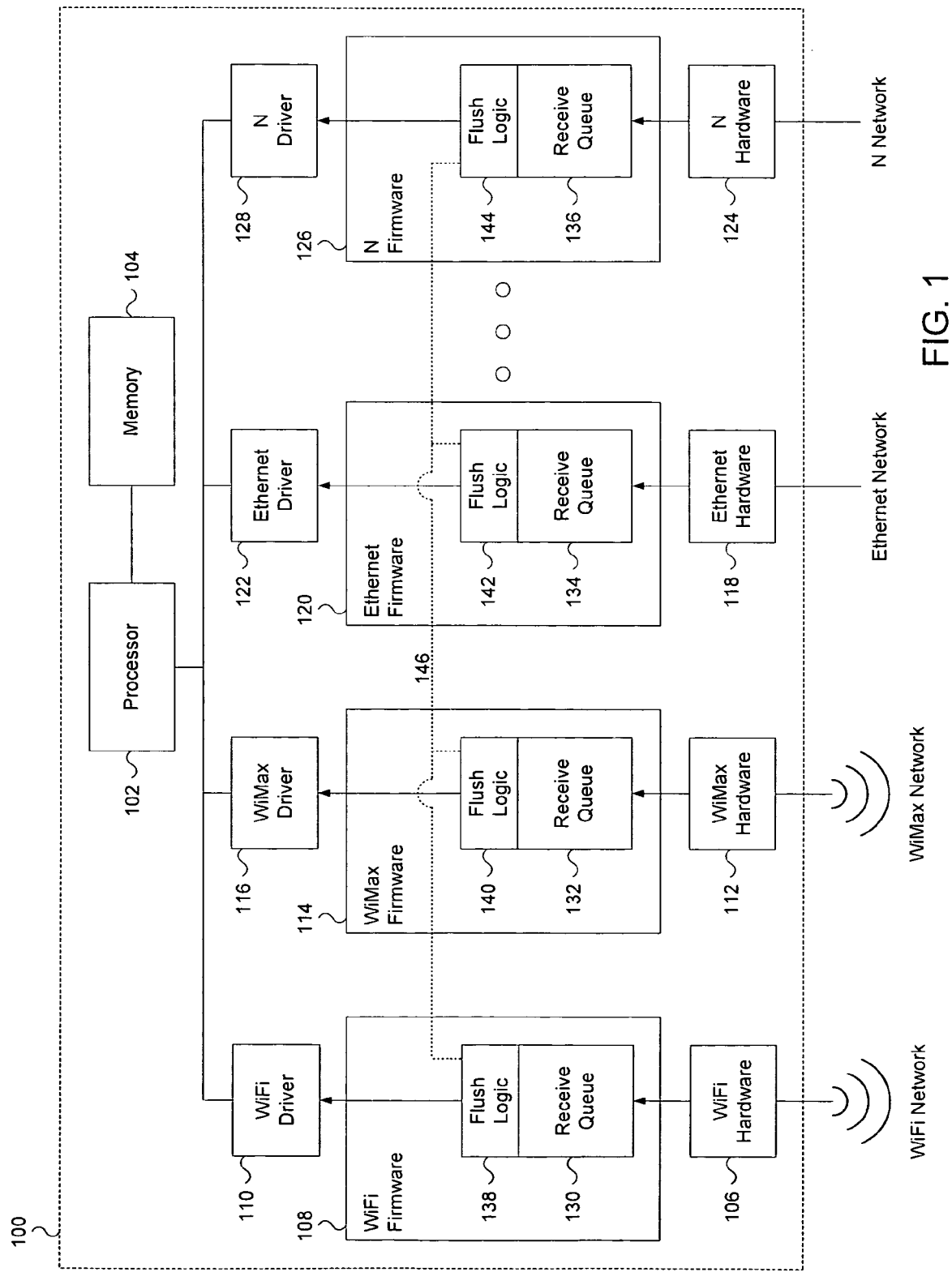
FIG. 1 describes an embodiment of a device capable of synchronizing incoming data traffic across multiple communication streams.

Embodiments of a device, method, and computer readable medium to synchronize incoming network traffic across multiple communication streams are disclosed.

With the non-deterministic nature of incoming network traffic on a computer platform, the communication interfaces (WiFi, WiMax, Ethernet, 3G, etc.) transfer the data to the host processor as soon as they receive it in an independently non-coordinated or synchronized fashion. This triggers a DMA transfer followed by an interrupt to the host processor. If the incoming data rate is above a threshold, then interrupt coalescing is done to optimize the behavior to a certain extent but the data is still transferred to host memory and the processor is taken out of its low-power consuming state. But in most common scenarios the non-deterministic nature of communication activity reduces the opportunities to have idle time that the platform and processor could take advantage of to enter lower power consuming states.

Thus, an incoming network packet storage queue may be implemented for each network that a computer platform (referred to as a device in following paragraphs) is coupled or connected to. Each queue stores incoming packets from each respective network until a flush condition occurs in the queue. The flush condition may include reaching a queue capacity limit, reaching a queue storage time limit, receiving a non-queueable packet, receiving a priority packet or receiving a notification that another network queue is being flushed, among other conditions. A flush logic monitors each queue for these conditions and will flush each queue when one of the conditions is met. This allows for synchronized network packet streams and potentially bursts of packets reaching the processor at a given time, intermingled with periods of little or no network packet traffic causing the host processor to wake and work on the packets. The potential lulls in network traffic between the flush events may allow the host processor to enter lower power states more regularly and stay in these lower power states longer.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment. Any embodiments related to the computer readable medium refer to a non-transitory computer readable medium. Therefore, the computer readable medium may refer to a storage disk, memory, or other tangible medium that may store instructions to be executed by a computer, but it is not referring to a carrier wave or other non-tangible means upon which instructions may be represented.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

FIG. 1 describes an embodiment of a device capable of synchronizing incoming data traffic across multiple communication streams.

In many different embodiments, device 100 may be a mobile device or a stationary device. The mobile device may comprise a cellular telephone, a handheld personal organizer, a music storage/player, a handheld gaming system, a laptop or notebook computer, or any other mobile device with access to one or more networks. The stationary device may be a desktop computer, a workstation computer, a server computer, a television set-top box, or a gaming console. Other variations of the device 100 may also be considered, such as a computer integrated into an automobile. Furthermore, any other possible implementation of the device 100 may also be considered as the list is not limiting but rather just lists a few examples.

In many embodiments, the device 100 includes one or more processors, such as processor 102. Processor 102 may have one core to execute instructions or it may have multiple cores. System memory 104 is coupled to processor 102 in many embodiments. System memory is capable of storing instructions and data that may be executed by processor 102. System memory 104 may be a form of dynamic random access memory (DRAM). For example, system memory 104 may comprise double data rate (DDR) synchronous DRAM or one of many other forms of DRAM. In other embodiments, system memory may be a non-volatile form of memory such as flash memory. Although not shown, in many embodiments, processor 102 may have an integrated memory controller to control access to system memory 104.

Device 100, in many embodiments, has hardware and/or software logic enabling device 100 to communicate across one or more networks. Networks that device 100 can communicate across may include wireless networks and/or wired networks. Examples of wireless networks may include an IEEE (Institute of Electrical and Electronics Engineers) 802.11-based WiFi network, an IEEE 802.16-based WiMax network, an IEEE 802.3-based Ethernet network, a Bluetooth network, or any other network capable of wireless communication. Examples of wired networks may include an Ethernet network, a USB network, a network using a proprietary wire solution (e.g. a wired network between a home audio/visual equipment set), or any other network capable of wire-based communication.

To gain access to these one or more networks, device 100 includes logic to control the communication between device 100 and the network(s). In many embodiments, the logic may include the hardware to link to the network, such as a plug interface for a wired network or a wireless transmitter and receiver for a wireless network. In the embodiment shown in FIG. 1, device 100 includes separate interfaces which allow connection to a WiFi network, a WiMax network, and an Ethernet network. Furthermore, the N network is an illustration which shows that one or more additional network interfaces may be present in device 100.

In FIG. 1, for each network interface, device 100 includes the hardware capable of physically connecting to the network, firmware to store functional logic to implement an embodiment, as well as a driver to provide a simple way to communicate between the firmware/hardware portions of the interface and the processor 102. Once the device is communicatively connected to the network, the device can send and receive packets of information on the network. A group of packets being received from a network may be referred to as a stream. Each network may have a different protocol, which may lead to a unique formation of a packet sent across the network (i.e. the packet header, the size of the packet, the data format of the packet, etc.). Each network may include a strict protocol that may specify the construction of a given packet sent on the network.

In the embodiment shown in FIG. 1, WiFi hardware 106 receives WiFi packets from the available WiFi network. The WiFi firmware 108 may include logic to assist in the construction and transport of WiFi packets. And the WiFi driver 110, which may reside in system memory (but is shown apart from system memory for ease of explanation), may allow communication between the processor and the WiFi interface.

This same configuration may be utilized with the other networks shown in the embodiment illustrated in FIG. 1. Specifically, WiMax hardware 112, WiMax firmware 114, and WiMax driver 116 allow device 100 to communicate with an available WiMax network and Ethernet hardware 118, Ethernet firmware 120, and Ethernet driver 122 allow device 100 to communicate with an available Ethernet network. Finally, one or more additional network communication interfaces, such as N hardware 124, N firmware 126, and N driver 128, may be available to connect to one or more additional networks, such as network N.

Per network, packets are received by the network hardware. Generally, if a packet is received when the device is in a low power mode, such as a processor sleep state, the network interface sends an interrupt or equivalent communication to the processor or processor power logic to wake the processor to execute the packet. For example, if a packet is received from the WiMax network, WiMax hardware 112 receives the packet (with potential logic help from the WiMax firmware 114). The packet is then immediately sent to the WiMax driver, which sends the command to the system memory 104. In FIG. 1, since the memory 104 is coupled to the rest of the system logic of the device through the processor, the WiMax driver 116 would send the packet to the processor 102 to be stored in the memory 104 (i.e. stored specifically by the memory controller integrated in the processor). The WiMax driver 116 may perform a direct memory access (DMA) transaction to get the packet into memory 104. Once the packet is in memory 104, processor 102 performs any necessary operations on the content of the packet.

In many undesirable scenarios, when the device 100 is connected or coupled to multiple networks, the randomness of the incoming packets may create an environment where the processor is continually put to sleep and woken up. This constant entry and exit between processor sleep and wake states may consume additional and unnecessary power within the units in the processor. Even if a given network stream arrives in bursts and then is quiet for stretches, when two or more incoming streams are combined and not synchronized, the processor may enter this constant wake/sleep scenario.

Thus, in many embodiments, the firmware for each network includes a receive queue to receive the network packets for that particular network. For example, receive queue 130 is located within the WiFi firmware 108 to store incoming WiFi packets from the WiFi hardware 106, receive queue 132 is located within the WiMax firmware 114 to store incoming WiMax packets from the WiMax hardware 112, receive queue 134 is located within the Ethernet firmware 120 to store incoming Ethernet packets from the Ethernet hardware 118, and receive queue 136 is located within the N firmware 126 to store incoming N packets from the N hardware 124.

The receive queue for a given network may be of any maximum length, such as, for example, 1, 2, 4, 6, 8, 16, or another positive integer value. Some variables that may be considered when deciding to determine the maximum size of a queue may include the value of the data within a type of packet, the amount of data stored within a packet, the frequency with which packets normally arrive, the packet burstiness, quality of a network, or any other possible consideration. Furthermore, the receive queues for different network interfaces may be of different length. For example, the WiFi receive queue 130 may have a length of 4 and the WiMax receive queue 132 may have a length of 8.

In addition to the maximum queue length for a given receive queue of a given network, another consideration for a queue may be a maximum storage time limit for a given packet. For example, if a queue is empty and the queue receives a first packet, a timer may start (the logic for the timer may be within the hardware, firmware, driver, or in another location within the device). The timer may reach a maximum storage time limit, which is the longest amount of time a packet is permitted to be stored within the queue before being sent to the memory 104. Examples of maximum storage times may be 1 ms (millisecond), 2 ms, 3 ms, 4 ms, 8 ms, etc. Once the maximum storage time has been reached, even if the queue is storing a number of packets that is below the maximum queue size, the packets within the queue may be sent (i.e. flushed) to the memory 104. Additionally, the maximum storage times for different receive queues may be different values. For example, the WiMax receive queue maximum storage time may be 6 ms whereas the Ethernet receive queue maximum storage time may be 2 ms.

Furthermore, if a particular packet arrives at the network interface (i.e. the hardware, firmware, and/or driver) and the arriving packet has a high priority, the priority may force the queue to send all packets queued to the memory 104. In other words, the priority may be high enough to not allow the packet to be queued (i.e. a non-queueable packet). In some embodiments, a packet may have one of two priority levels, a (lower) queueable priority level and a (higher) non-queueable priority level. In other embodiments, a packet may have one of many priority levels. In these embodiments, a threshold priority level may be set where any packet with a priority level below the threshold priority level is queueable and any packet with a priority level at or above the threshold priority level is non-queueable. There may be one or more packets already queued in the network packet receive queue when a non-queueable packet arrives. In many of these cases, all packets are sent (i.e. flushed) to the memory 104 to allow the packets to arrive at the memory in the order they were sent across the network.

Thus, in many embodiments, a given network's receive queue is managed by the rules discussed above and possibly one or more other rules for storing and flushing incoming packets. In many embodiments flush logic in each firmware manages the receive queue for its respective receive queue (i.e. flush logic 138 for the WiFi receive queue 130; flush logic 140 for the WiMax receive queue 132, flush logic 142 for the Ethernet receive queue 134, up to flush logic 144 for the N receive queue 136). Flush logic monitors the receive queue within the same firmware and determines if any of the queue flush conditions are met. If a flush condition is met, flush logic flushes the local (i.e. same network interface) receive queue to the memory 104 and additionally, sends a notification across link 146 to each of the other flush logics for each of the other networks to notify the other network interface flush logics that one of the queues is being flushed.

In many embodiments, to allow for the synchronization of incoming network packets (i.e. data traffic) across multiple networks, if a given network flush logic receives a notification of a queue flush from another network receive queue, the given network flush logic flushes its own queue as well. Thus, when one receive queue reaches a flush condition, all receive queues may be flushed relatively simultaneously. This can increase synchronization because all queues are flushed at the same time, which allows the processor 102 to operate on a burst of packets immediately following the flush and then potentially revert to a processor sleep state after the operations have been completed and remain in the sleep state potentially for one or more milliseconds while the one or more receive queues are filling up with additional packets. In many embodiments, this queue flush synchronization process allows for the processor to stay in a lower power state for more time to conserve overall device power consumption.

In other embodiments that are not shown in FIG. 1, two or more network interfaces may couple to the same network. For example, the Ethernet interface may have two separate Ethernet controllers (i.e. two Ethernet hardware devices, two Ethernet firmwares, etc). In some embodiments where two or more interfaces may be coupled to the same network, each hardware interface to the network may have its own queue. In these embodiments, each queue may have its own set of flush rules. In other embodiments, the plurality of hardware interfaces coupled to the single network may have a combined queue.

Figure 2:
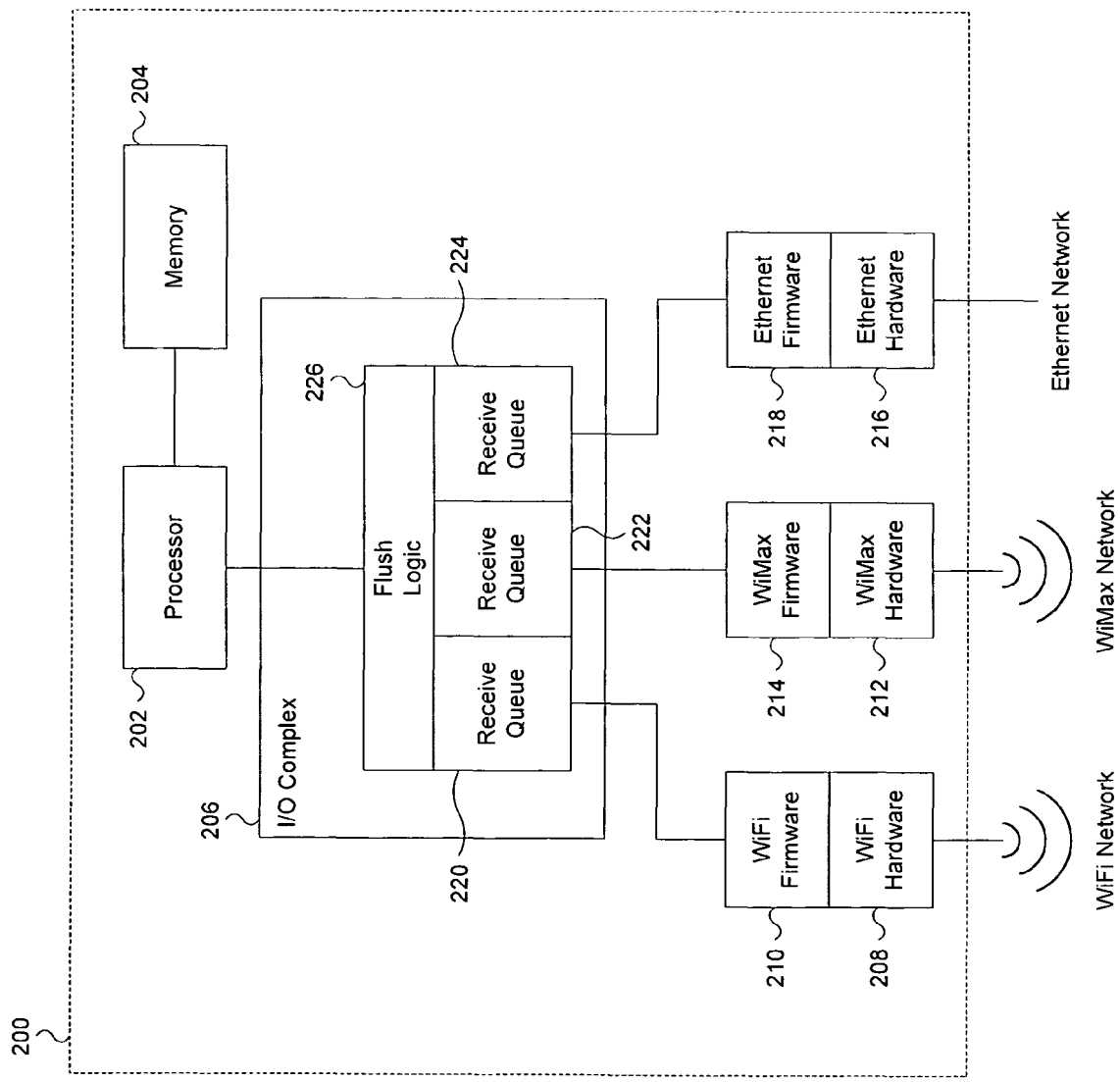
FIG. 2 describes another embodiment of a device capable of synchronizing incoming data traffic across multiple communication streams.

FIG. 2 describes another embodiment of a device capable of synchronizing incoming data traffic across multiple communication streams.

Device 200 in FIG. 2 is similar in nature to Device 100 in FIG. 1. Device 200 includes processor 202 and memory 204. Processor 202 and memory 204 are similar in nature to processor 102 and memory 104 as described in FIG. 1. Device 200 includes an I/O (input/output) complex 206. The I/O complex 206 is coupled to the processor 202 and memory 204 through a data link. In many embodiments, the I/O complex 206 may include one or more I/O host controllers (not shown) to provide control over one or more I/O links each coupling the I/O complex to one or more I/O devices. For example, an I/O link may be a USB (Universal Serial Bus) link or a PCI (Peripheral Component Interconnect) Express link, an IEEE 1394 "Firewire" link, or another protocol link.

In many embodiments, device 200 includes one or more network interfaces coupling the device 200 to one or more wireless and/or wired networks. The embodiment as shown in FIG. 2 includes a WiFi network interface (including WiFi hardware 208 and WiFi firmware 210), a WiMax network interface (including WiMax hardware 212 and WiMax firmware 214), and an Ethernet network interface (including Ethernet hardware 216 and Ethernet firmware 218). In other embodiments that are not shown, there may be one or more other network interfaces also incorporated into device 200. Additionally, in certain embodiments that are not shown, one of the network interfaces shown in FIG. 2 may not be present.

Device 200, unlike device 100 in FIG. 1, does not have the receive queues for each network integrated into the network firmware. Instead, the receive queues are integrated into the I/O complex 206 in device 200. Specifically, receive queues, 220, 222, and 224, which receive network packets from the WiFi network interface, the WiMax network interface, and the Ethernet network interface, respectively, are all contained within the I/O complex 206. Furthermore, in many embodiments, the flush logic utilized to determine when to flush the receive queues, may be a single flush logic that is coupled to each of the queues. Thus, the flush notification between queues can be internalized to flush logic 226 within the I/O complex 226. Flush logic 226 may monitor receive queues 220, 222, and 224 simultaneously and, once one of the queues has had a flush condition, flush logic may flush all of the queues to memory 204.

Figure 3:
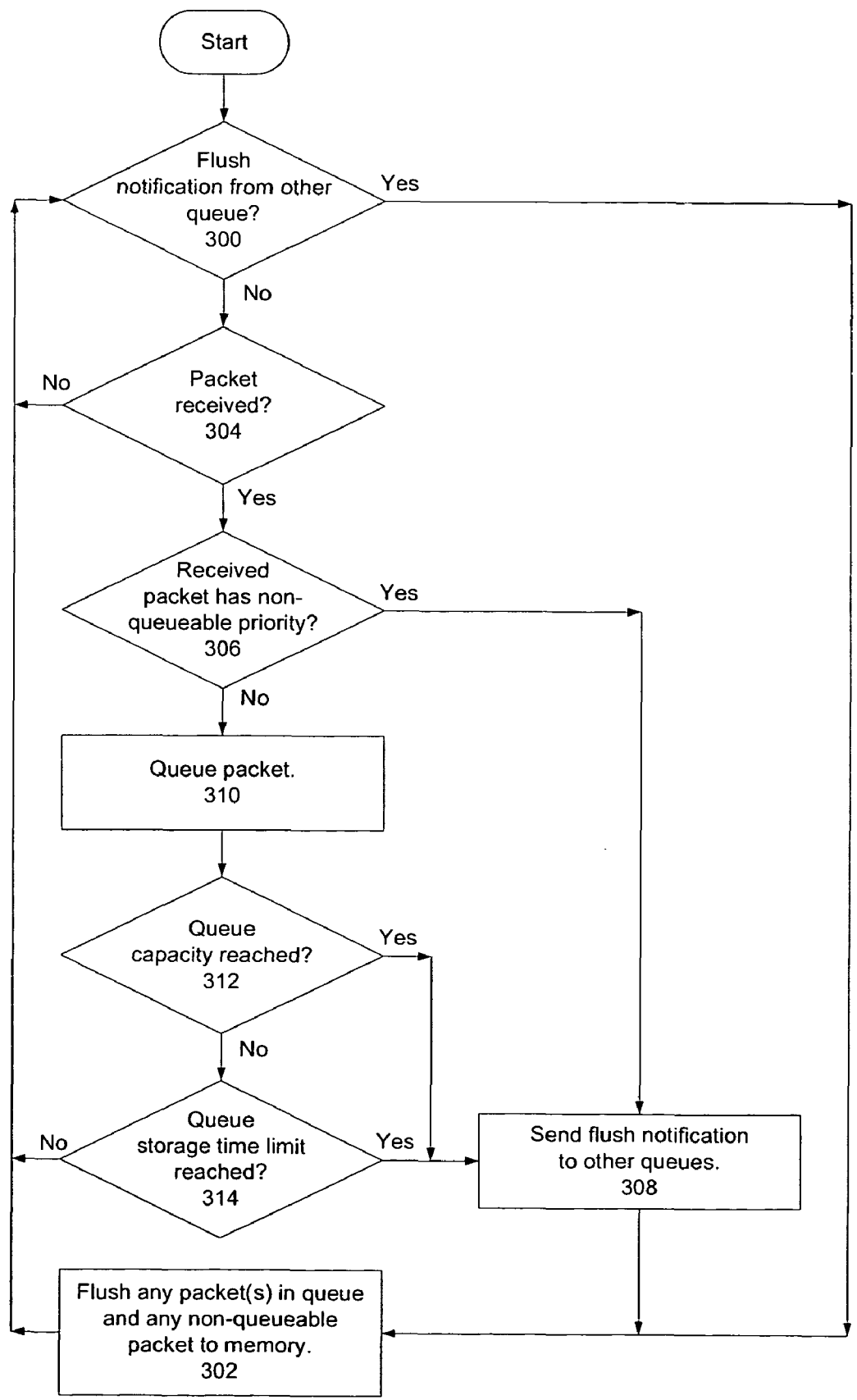
FIG. 3 is a flow diagram of an embodiment of a process to synchronize incoming data traffic across multiple communication streams.

FIG. 3 is a flow diagram of an embodiment of a process to synchronize incoming data traffic across multiple communication streams.

The process is performed by processing logic, which may comprise software (e.g. instructions to be executed by a processor that are saved within a memory, to a storage device, or to any form of media that can physically store data), hardware (e.g. component(s) within a general purpose or special purpose computer system), or a combination of both. In many embodiments, the processing logic monitors an incoming network packet storage queue. For ease of explanation, the monitored queue may be referred to as the "local" queue (i.e. local to the network interface the processing logic is monitoring) and any non-local queues may simply be referred to as "other" queues or "another" queue.

The process begins by processing logic determining if a network packet storage queue flush notification from another network packet storage queue has been received (processing block 300). If a notification has been received, then processing logic proceeds to flush any packets that are in the local queue to memory (processing block 302). On the other hand, if no flush notification has been received, then processing logic determines whether a packet has been received from the network (processing block 304). If no packet has been received from the network, then processing logic returns to block 300.

Otherwise, if a packet has been received from the network, then processing logic determines whether the packet has a non-queueable priority level (processing block 306). If the priority level of the packet makes the packet non-queueable, then processing logic sends a flush notification to all other queues (processing block 308). Next, processing logic flushes any packets in the local queue along with the non-queueable packet to memory (processing block 302) and the process returns to block 300.

Returning to block 306, if the received packet is queueable, then processing logic queues the network data packet (processing block 310). Once the packet has been queued, processing logic determines whether the capacity of the local queue has been reached with the newly queued packet (processing block 312). If the capacity has been reached, then processing logic sends a flush notification to all other queues (processing block 308). Next, processing logic flushes any packets in the local queue to memory (processing block 302) and the process returns to block 300.

Returning to block 312, if the local queue capacity has not been reached, then processing logic determines whether the queue storage time limit has been reached (processing block 314). If the storage queue time limit has not been reached, then processing logic returns to block 300. Otherwise, if the storage queue time limit has been reached, then processing logic sends a flush notification to all other queues (processing block 308). Next, processing logic flushes any packets in the local queue to memory (processing block 302) and the process returns to block 300.

Thus, embodiments of a device, method, and computer readable medium to synchronize incoming network traffic across multiple communication streams are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising:
 a host processor;
 a memory to store network packets flushed from one or more network package storage queues, wherein the processor processes the network packets stored in the memory;
 a first network packet storage queue to store a plurality of incoming network packets from a first network of a plurality of networks;
 a second network packet storage queue to store a plurality of incoming network packets from a second network of the plurality of networks; and
 flush logic to:
  delay the plurality of network packets stored in the first and second network package storage queues from transferring from the first and second network packet storage queues to the memory until a flush event takes place, wherein the flush event takes place at least after a storage time limit occurs for at least one of the packets stored in first or second network package storage queues, the storage time limit being a predetermined maximum amount of time a given packet is allowed to be stored in one of the first and second network package storage queues;
  in response to the flush event taking place, synchronize a simultaneous flushing of all network packets stored in the first and second network packet storage queues.

2. The device of claim 1, wherein the flush event comprises at least one of the first network packet storage queue and second network packet storage queue reaching a maximum queue capacity.

3. The device of claim 1, wherein the flush event comprises at least one of the first network packet storage queue and second network packet storage queue receiving a non-queueable priority packet.

4. The device of claim 1, wherein the flush logic is further operable to send an interrupt to the host processor in the device to service the flushed network packets in the memory.

5. The device of claim 1, further comprising:
 a first communication interface coupled to one of the plurality of networks to provide a communication link between the device and the one of the plurality of networks; and
 a second communication interface coupled to one of the plurality of networks to provide a communication link between the device and the one of the plurality of networks.

6. The device of claim 5, wherein the first communication interface is further operable to store the first network packet storage queue and wherein the second network communication interface is further operable to store the second network package storage queue.

7. The device of claim 1, wherein the first and second network packet storage queues are integrated into an input/output complex in the device.

8. The device of claim 1, further comprising:
 at least one additional network storage packet queue to store incoming network packets from at least one additional network of the plurality of networks,
 wherein the flush logic is further operable to synchronize a flush of the network packets stored in the first, second, and at least one additional network packet storage queues, the flush being triggered by a flush event affecting at least one of the storage queues.

9. A method, comprising:
 storing a plurality of incoming network packets from a first network in a first network packet storage queue;
 storing a plurality of incoming network packets from a second network in a second network packet storage queue;
 delaying the plurality of network packets stored in the first and second network package storage queues from transferring from the first and second network packet storage queues to a memory until a flush event takes place, wherein the flush event takes place at least after a storage time limit occurs for at least one of the packets stored in first or second network package storage queues, the storage time limit being a predetermined maximum amount of time a given packet is allowed to be stored in one of the first and second network package storage queues;
 in response to the flush event taking place, simultaneously flushing all of the network packets stored in the first and second network packet storage queues.

10. The method of claim 9, wherein the flush event comprises at least one of the first network packet storage queue and second network packet storage queue reaching a maximum queue capacity.

11. The method of claim 9, wherein the flush event comprises at least one of the first network packet storage queue and second network packet storage queue receiving a non-queueable priority packet.

12. The method of claim 9, further comprising:
sending an interrupt to a host processor to service the flushed network packets in the memory.

13. A non-transitory computer readable medium, having stored thereon instructions, which upon execution by a processor causes the processor to perform a method, comprising:
storing a plurality of incoming network packets from a first network in a first network packet storage queue;
storing a plurality of incoming network packets from a second network in a second network packet storage queue;
delaying the plurality of network packets stored in the first and second network package storage queues from transferring from the first and second network packet storage queues to a memory until a flush event takes place, wherein the flush event takes place at least after a storage time limit occurs for at least one of the packets stored in first or second network package storage queues, the storage time limit being a predetermined maximum amount of time a given packet is allowed to be stored in one of the first and second network package storage queues;
in response to the flush event taking place, simultaneously flushing all of the network packets stored in the first and second network packet storage queues.

14. The computer readable medium of claim 13, wherein the flush event comprises at least one of the first network packet storage queue and second network packet storage queue reaching a maximum queue capacity.

15. The computer readable medium of claim 13, wherein the flush event comprises at least one of the first network packet storage queue and second network packet storage queue receiving a non-queueable priority packet.

16. The computer readable medium of claim 13, further comprising:
sending an interrupt to a host processor to service the flushed network packets in the memory.

* * * * *